Aug. 21, 1945.   C. V. SCHUYLER   2,383,165
MARKED STEEL BAR AND METHOD OF MARKING
Filed Jan. 10, 1944
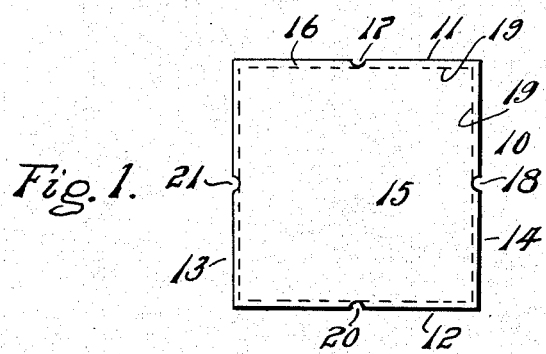
Fig. 1.
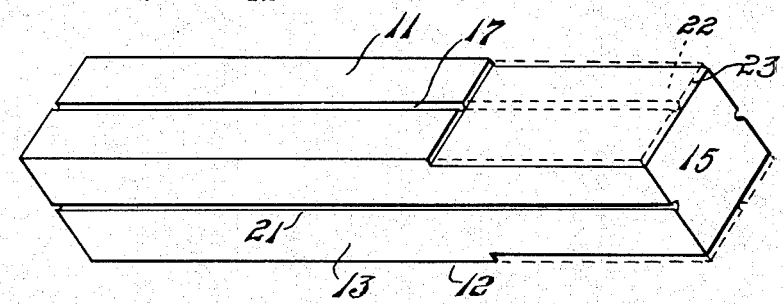
Fig. 2.
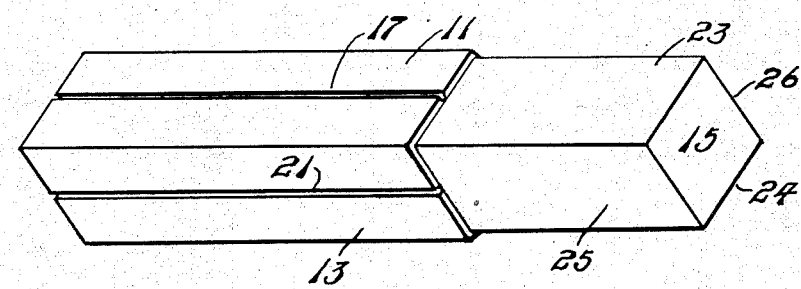
Fig. 3.
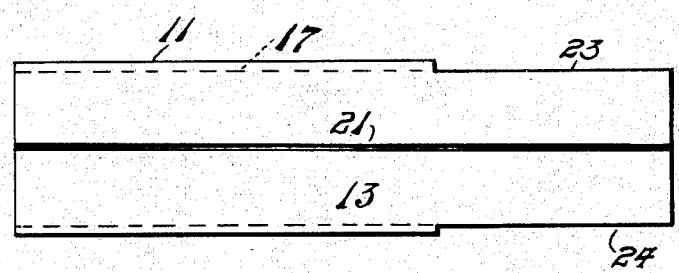
Fig. 4.
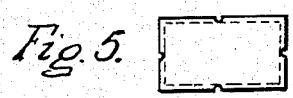   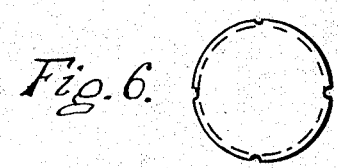
Fig. 6.   Fig. 5.
INVENTOR.
Charles V. Schuyler,
By Barr, Borden & Fox
ATTORNEYS.

Patented Aug. 21, 1945

2,383,165

UNITED STATES PATENT OFFICE 2,383,165

MARKED STEEL BAR AND METHOD OF MARKING

Charles V. Schuyler, Philadelphia, Pa.

Application January 10, 1944, Serial No. 517,760

4 Claims. (Cl. 29—148)

This invention relates to marking steel bars.

As steel bars or rods are customarily furnished to processors of the bars or rods, such as tool and die makers, fabricators, the metal manufacturing industry or processors of steel from bar stocks or shapes into finished machinery or metal working parts, or metal articles, as, for purely illustrative purposes, to die or tool makers, for example, they are furnished in rather exact sizes in the particular shapes required, and in an annealed or relatively soft condition. The bars under discussion may be of any desired profile in section, generally characterized as steel bars, flats, squares, rounds, shapes, etc., but for purposes of illustration only will be assumed herein to be oblong bars substantially square in cross section.

It is conventional for the customers, processors, or users to process the relatively soft bars or rods to exact shapes, as by machining one, two, or more sides or lateral surfaces of the rods to exact measurements to secure exact thicknesses. Such accurate machining is preliminary to hardening operations either in the plant of the processors, or in special heat-treating plants operated by others.

It will be evident that for such purposes as dies and tools, again for purely illustrative example only, the finished heat-treated and hardened surfaces must be of uniform density and hardness and must also be of extreme accuracy of dimensions. Any deviation from exactness of dimension immediately converts the bar thus worked upon into scrap, at least as far as the particular purpose intended for that specific bar is concerned. On the other hand, any incidental happening that makes one of the working surfaces of a tool softer than another in the finished tool or die, for example, even while exact and accurate dimensions are maintained, is a circumstance which also converts the tool or die into scrap, at least so far as the instant purpose is concerned.

All tool and die makers and the like following conventional prior art practices are subject to very appreciable losses through these factors, as the time wasted in unusable machining and heat-treating operations is quite appreciable apart from the difference in value of new rolled bars and that of scrap metal.

Of course, when "scrap" is mentioned herein, it is intended to be sufficiently generic as to include both actual and effective scrap. That is, it includes both bars that are actually wasted for all purposes other than re-melting in new steels or similar scrap uses, as well as those which may be susceptible to salvage by further machining and hardening processes to form finished bars of smaller dimensions than contemplated in the initial machining operations. Obviously, the extra labor represented by this latter procedure represents a direct loss to the processor.

It is an unfortuitous fact that bars as formed and rolled in the fabricating mill are invariably subject to what might be designated as differential carburizing whereby through partial carburizing or decarburizing there is formed on the lateral surfaces of the finished bars to be delivered to the customers, an undesired superficial skin or layer. This outer surface which is called "soft skin" or "mill skin" is integral with the body of the steel bar, but is different from the mass of the bar inside of the skin probably both chemically and molecularly. The mill skin, as it will be designated hereinafter for simplicity, reacts differently to the hardening heat-treatment ultimately given to the bar after machining processing so that unless it is removed before such hardening heat treatment, such skin remains relatively soft and if it happens to be a "working" surface, ruins the piece upon which it appears. As in many uses for bars or on many finished or unfinished surfaces of bars, its presence is not necessarily undesirable and the expense of removal would be high, it is normally never removed by the mill, and therefore conventionally always appears on bars sold to consumers, but its untoward effects are known through experience to almost all heat-treaters, and by many of the mechanics who must work the metal preparatory to heat treatment. Knowledge of its existence, however, is not enough, as among other disadvantages of the mill skin is the fact that it cannot readily be detected visually. In other words, if partially removed by a machining operation, the remaining layer of mill skin visually is identical with the mass of real steel beneath the surface or on an adjoining surface from which all of the mill skin has been removed. Moreover, the depth or thickness of the mill skin cannot be exactly predetermined. In other words, it may vary in depth within quite wide limits between two lots or batches of bars of the same rolled sizes but of different "runs." As the existence of the mill skin is visually difficult to ascertain, and as the thickness varies slightly between bars, its exact removal is technically a difficult matter.

Among the difficulties attendant upon use of steel possessed of mill skin, is the fact that in machining two opposite sides of a bar substantially square in section, for instance, it is not uncommon for the machinist to remove too much skin on one surface, and, measuring the second cut accurately with reference to the first with a micrometer in order to have a finished piece of exact thickness, he may remove too little on the second surface with a consequent retention on the supposedly accurately finished surface of a thin residual layer of mill skin. There is no superficial test by which this can be determined, and when the machined piece is heat treated, it is found that although one surface measures up to the proper hardness standards, the other parallel surface retaining some mill skin has a superficial layer of still soft steel which does not measure up to the hardness standards, and this piece is therefore scrapped. There are many similar ways in which the presence of the mill skin and its variable thicknesses causes delay, waste, and undue amounts of scrap.

It is readily possible for the fabricating or rolling mill to determine rather accurately what the thickness of the mill skin is for any run or lot of bars in a given output. Usually the depth of mill skin is substantially the same for all pieces in a given run.

It is among the objects of this invention: to provide a marking system for steel bars by which the fact that a given surface is formed of mill skin can be readily detected visually; to provide a system of marking for steel bars by which the depth of the mill skin on the surfaces of the bars can be readily determined; to provide a method of marking by which the fact of the existence of mill skin on a surface and its depth can both be determined and continuously indicated; to provide a new article of manufacture comprising a steel bar with markings of the existence and depth of superficial mill skin on the bars; to furnish a gauge for the removal of the superficial mill skin on a bar; to provide a two-stage process for hardening steel bars without also attempting unwitting hardening of the superficial mill skin inadvertently therewith; and many other objects and advantages of the invention will become more apparent as the description proceeds.

In the accompanying drawing forming part of this description,

Fig. 1 represents an end elevation of a steel bar according to an illustrative form of the invention, indicating in dotted lines the depth of the mill skin with which the bar is completed, and illustrating the grooves or channels by which both the existence and depth gauging of the mill skin is indicated.

Fig. 2 represents a perspective of a bar according to the preferred form of the invention, with an end reduced in thickness on two parallel sides to the desired finished thickness, and indicating in dotted lines the thickness of the mill skin that is removed in the processing.

Fig. 3 represents a similar view of another steel bar marked according to the preferred form of the invention, with all four of the side surfaces toward the end reduced in thickness by removal of the soft skin on each surface.

Fig. 4 represents a side elevation of the bar of Fig. 2, and

Figs. 5 and 6 represent end elevations of modified forms of bar to which the invention pertains.

Referring to Fig. 1, there is shown an end elevation of a bar 10 as provided by conventional rolling mills, having illustratively upper and lower substantially parallel surfaces 11 and 12 and substantially parallel lateral surfaces 13 and 14 respectively. The central portion or the mass 15 of the bar is, at the surfaces just recited, completed by a continuous superficial partially carburized or decarburized mill skin 16 defined by dotted lines 19 as shown. The possibly slightly exaggerated depth of the mill skin according to Fig. 1, indicated by dotted lines 19, will facilitate an understanding of the problem involved in forming a tool in which one pair of opposite parallel surfaces, for instance, is to be machined or ground off to establish a certain exact distance between the parallel machined surface. If, as is the normal case, the distance between surfaces 11 and 12 after they have been accurately machined is to be just exactly the vertical distance between the dotted lines 19 adjacent to surfaces 11 and 12 indicating the termination of the mill skin and the beginning of the steel mass, the machining must be most accurately accomplished. If the cut on surface 11, for instance, should be too deep, it will be clear that the accurately measured machining of the surface 12, measured relative to the previously machined surface 11, will be too light, and the cut will come between the outer surface 12 and the dotted line 19 adjacent thereto, and there will consequently be a thin residual layer of mill skin on the surface 12. On the other hand, if the cut on surface 11 is too light, then on surface 12 it will be too heavy. In this latter case it will then be the cut surface 23 on surface 11 that will still retain a thin layer of mill skin. According to present practices, there is no way of preventing such occurrences, and it is largely a matter of experience as to average depth of mill skin whether all is removed that is intended to be removed or only a part.

In carrying out the instant invention in a purely illustrative manner, I provide in all of the surfaces slots or grooves, respectively 17, 18, 20 and 21, which I prefer to designate as surface-piercing apertures or recesses, preferably extending full length of the bars, and each aperture of a depth exactly corresponding to the depth or thickness of the mill skin on the surface containing the particular aperture. The grooves are quite narrow, if desired, and may comprise saw cuts, milling machine grooves, drilled recesses, or otherwise, so long as they are both visually noticeable in the external surface, and of sufficient width at their bases at the mergence of the mill skin and the real steel as to be visually noticeable, as any metal above the bottoms or bases of the apertures is removed.

Usually, after determination of the average depth of the mill skin from the first bar or rod, or so, the experienced rolling mill employees will, for example, set cooperating saws, such as rotary saws, at the proper clearance for given thicknesses of bars as to make cuts of the proper depth for the given thickness or depth of the mill skin on the bar, and then will rapidly feed the entire lot of bars in succession through the saws to impart the desired depth of aperture cut to each surface. The apertures disclosed, whether continuous, or intermittent and longitudinally spaced, or even annular, will continuously indicate the existence of mill skin on the given surface of the bar under consideration to all concerned, whether it be the machinist or the heat-treater, and, of probably equal importance, it will also continuously indicate the depth of the mill skin, as a gauge of the amount that must be removed which indication maintains even after some part of the mill skin has been removed containing the aperture.

As shown in Fig. 2 according to a purely illustrative procedure, an end of the upper surface 11, containing its visual and gauge slot or groove aperture 17, is first machined or ground off to remove the desired amount of mill skin indicated by the substantial rectangle 22 defined by the dotted and full lines of Fig. 2, which also removes the boundary surfaces defining the groove 17 at said end of the bar, so that the lower surface of the aperture 17 is exactly tangential to the plane of the machined surface 23, which thus both obliterates the guide and gauge groove, and also simultaneously removes just the right amount of the outer mill skin surface as to expose the solid steel surface 23 of the mass 15 of the bar 10. Obviously, the removal of the exact amount of steel comprising the mill skin has also completely removed the guide and indicating aperture 17 with it. It will be apparent at this juncture therefore that anyone knowing the significance of the surface apertures will be able to look at the bar, with its one surface (11) machined in part only (at 23) which, of course, can be for the full length of the bar 10, if desired, and can tell that there are three other surfaces which still retain mill skin, and one surface containing, in part at least, no mill skin. If all four are working surfaces, they cannot properly be heat treated to make a satisfactory tool. It also advises the machinist of the condition of the remaining surfaces on the bar, that is, whether the mill skin is still to be removed, and to what extent. Pursuant to the just described finishing of the first surface to the desired length according to the use of the ultimate tool or die and to at least the required depth of mill skin removal according to the predetermination accorded by the depth of the channel or groove 17, then the corresponding parallel surface 12 is similarly machined. In this operation, the groove aperture 20 in surface 12 is used as the gauge to insure the removal of the proper depth of differentially carburized mill skin until the groove 20 has but just been obliterated. This will thus give a finished parallel surface 24 of the desired length longitudinally of the bar, and with both the surfaces 23 and 24 formed of pure uncoated steel without mill skin on either surface. If these two surfaces alone are all that may be desired to be hardened, after determination of the exact dimensions between the surfaces has been established, by such subsequent machining or grinding steps as may be necessary to attain the proper micrometer reading for the thickness of the tool desired, the bar is given to the heat-treater for hardening. The latter knows at once by mere visual inspection that the two side surfaces 13 and 14 still contain mill or soft skin, and that no such skin remains on either surface 23 or 24, and can proceed accordingly to heat-treat the bar, knowing that the work cannot be rejected on the ground that either of the surfaces 23 or 24 still contain rudimentary or residual mill skin layers.

If it is desired that the entire end, or indeed, the entire bar be susceptible to proper heat treatment to establish uniform hardness, then the bar as machined in Fig. 2, may be completed by the formation of the connecting side surfaces 25 and 26, formed by suitably removing the soft skin layer on the sides 13 and 14 until the gauge grooves 21 and 18 respectively have but just been removed. The reduced end of the machined bar of Fig. 3 formed of surfaces 23, 24, 25, and 26 will be immediately understood by all concerned to have no mill skin remaining and therefor that all four surfaces can be evenly hardened.

As shown in Figs. 5 and 6, the invention is applicable to bars of different contours from the illustrative preferred embodiment. It will also be clear that the skin-indicating and depth-defining surface-piercing recesses or apertures may be of any desired shapes and sizes, and, as noted, may be continuous or interrupted, may be annular as well as elongated, and may be provided by punches or the like as well as by the actual removal of metal. It will be evident that the only essential is that the mark be in the surface of the bar, and that the mark have a metal-piercing depth equivalent to the thickness of the mill skin and be of observable width at its base.

The advantages of the invention are thought to be obvious, as will be the fact that the description as to marking above given is not limitative, either as to time or personnel, as the marking does not need to be done at the fabricating mill nor at the termination of the milling operation. In other words, steel bars or rods held in storage by wholesalers, jobbers and the like, or stored by the ultimate processors, such as the purely illustrative tool or die makers mentioned, for instance, or others, can just as readily be subjected to the marking operations as the steel in the rolling mill. Indeed, the only requirement is that it be properly marked before the final machining or grinding and hardening operations are begun.

Having thus described my invention, I claim:

1. The method of forming bar surfaces of metal bar stock as a preliminary to heat treatment which consists in ascertaining the depth of mill skin on the surface of the bar, forming a surface-piercing aperture in the surface of the depth of the mill skin, removing an area of the surface layer of mill skin until the part of the aperture in said area has been removed to insure removal of all of the mill skin in said area of the surface.

2. As an article of manufacture, a steel bar stock having a surface layer formed of mill skin, a surface-piercing aperture disposed in and extending completely through the mill skin layer only as a visual indication of the existence of the mill skin and as a depth gauge of the thickness of the layer of mill skin.

3. As an article of manufacture, a steel bar stock having a surface layer formed of mill skin, a surface piercing-aperture disposed in and extending completely through the mill skin layer only as a visual indication of the existence of the mill skin and as a depth gauge of the thickness of the layer of mill skin, said aperture comprising a surface groove extending longitudinally of the bar.

4. As an article of manufacture, a steel bar stock having lateral surfaces, all of said surfaces including a layer of mill skin, each of said surfaces including a surface-piercing aperture disposed in and extending completely through the mill skin only on said surface as visual indications of the existence of mill skin on a given surface containing an aperture and as a gauge of the thickness of such layer of mill skin, each surface-piercing aperture comprising a machined surface groove of uniform size extending longitudinally of the bar in each respective surface.

CHARLES V. SCHUYLER.